United States Patent [19]

Frantz

[11] Patent Number: 4,519,819

[45] Date of Patent: May 28, 1985

[54] PRECOALESCER UNIT

[75] Inventor: Virgil L. Frantz, Salem, Va.

[73] Assignee: Roanoke College, Salem, Va.

[21] Appl. No.: 643,414

[22] Filed: Aug. 23, 1984

[51] Int. Cl.³ .............................................. B01D 53/04
[52] U.S. Cl. ........................................ 55/162; 55/179; 55/218; 55/330; 55/333; 210/DIG. 5
[58] Field of Search ................. 55/162, 179, 218, 316, 55/330, 333, 355, 498, DIG. 17; 210/493.1, 493.5, DIG. 5

[56] References Cited

U.S. PATENT DOCUMENTS

| | | | |
|---|---|---|---|
| 3,464,186 | 9/1969 | Hankison et al. ................. | 55/316 X |
| 3,527,027 | 9/1970 | Knight et al. ..................... | 55/316 X |
| 3,796,025 | 3/1974 | Kasten .................................. | 55/316 |
| 3,890,122 | 6/1975 | Frantz ............................... | 55/218 X |
| 4,029,486 | 6/1977 | Frantz .................................. | 55/218 |
| 4,131,442 | 12/1978 | Frantz ............................... | 55/316 X |
| 4,156,601 | 5/1979 | Pieciak .......................... | 210/DIG. 5 |
| 4,199,331 | 4/1980 | Frantz ............................... | 55/179 X |
| 4,231,768 | 11/1980 | Seibert et al. ......................... | 55/179 |
| 4,336,043 | 6/1982 | Aonuma et al. ................... | 55/218 X |
| 4,468,239 | 8/1984 | Frantz ............................... | 55/179 X |

Primary Examiner—Robert Spitzer
Attorney, Agent, or Firm—Wilmer Mechlin

[57] ABSTRACT

A precoalescer unit for a twin tower assembly for decontaminating compressed gas the towers of which each contain a desiccant and under timer control of individual solenoid valves alternately receive contaminated gas and individually cycle between decontaminating and regenerating cycles, the precoalescer unit being interposed in the path of flow of contaminated gas from a source to the towers' inlet ports and having a casing and a double-seated drain valve on the casing and connected for actuation to an actuating gas line of one of the towers, the casing containing an open-ended in-out tubular coalescer and a valve in and normally closing a lower end of the coalescer and opening under differential pressure on opening of the drain valve for enabling the precoalescer unit, in response to cycling of the towers, to be purged cyclically of coalesced oil drained by gravity from the outside and contaminants washed from the inside of the tubular coalescer by compressed gas received from the source.

6 Claims, 4 Drawing Figures

PRECOALESCER UNIT

BACKGROUND OF THE INVENTION

In my copending application Ser. No. 456,416, filed Jan. 7, 1983, now U.S. Pat. No. 4,468,239, there is disclosed a twin tower assembly for decontaminating compressed gas, the towers of which each contain a desiccant and under timer control of individual solenoid valves alternately receive contaminated gas and individually cycle between decontaminating and regenerating cycles. Whether the source is a compressor or a reservoir, the compressed gas usually contains as principal contaminants water and oil, the latter in the form of a mist or aerosol dispersion and larger particles entrained in the gas. The desiccant in the towers preferably is a molecular sieve suitable for adsorbing moisture and, if exposed to oil, such a sieve is rapidly contaminated by blocking of its pores. It therefore is vital that oil entrained in the gas undergoing decontamination be removed before the gas reaches the desiccant. In the above application this is accomplished by containing in each tower upstream of the desiccant a hollow cylinder or tube of knitted wire mesh, on passing of the gas through the side wall of which from outside to inside, entrained oil in the form of mist and fine particles is coalesced and a combination of gravity drainage and, during a regenerating cycle, a reverse flow of clean purge gas, are depended on for purging the coalescer of oil trapped therein. The present application is primarily directed to an improvement on the assembly of the above application in the removal of entrained oil in advance of the desiccant.

SUMMARY OF THE INVENTION

The primary object of the present invention is to provide for a twin tower assembly for decontaminating compressed gas an improved precoalescer unit having a tubular coalescer mounted in the path of flow of contaminated gas from a source to the inlet ports of the towers and valving responsive to cycling of the towers without backwashing adapted to be cyclically purged of contaminants accumulated both inside and outside the coalescer.

Another object of the invention is to provide for a twin tower compressed gas decontaminating assembly an improved precoalescer unit disposed upstream of the towers in the flow path of the contaminated gas from a source and having as an in-out coalescer an open-ended tube containing between rigid foraminous cylindrical retainers a multilayered corrugated coalescing medium having layers of different density of coated borosilicate fibers sandwiched between porous support layers, and valving responsive to cycling of the towers for cyclingly purging the unit of accumulated contaminants.

An additional object of the invention is to provide for a twin tower assembly for decontaminating compressed gas a precoalescer unit having a casing mounted on an inlet manifold of the assembly and therethrough connected on an inlet side to the assembly's source of contaminated gas and on an outlet side to inlet ports of the towers, the casing containing in the path of flow of the contaminated gas between its inlet and outlet sides an in-out open-ended tubular coalescer, a double-seated drain valve on the casing connected for response in opening and closing to an actuating gas line of one of the towers, and a valve in and normally closing a lower end of the coalescer and opening under differential pressure on opening of the drain valve for cyclically purging the unit of contaminants accumulated both inside and outside of the coalescer.

The above and other objects and advantages of the invention will appear hereinafter in the detailed description, be particularly pointed out in the appended claims, and be illustrated in the accompanying drawings, in which:

FIGURE DESCRIPTION

DETAILED DESCRIPTION

Figure 1:
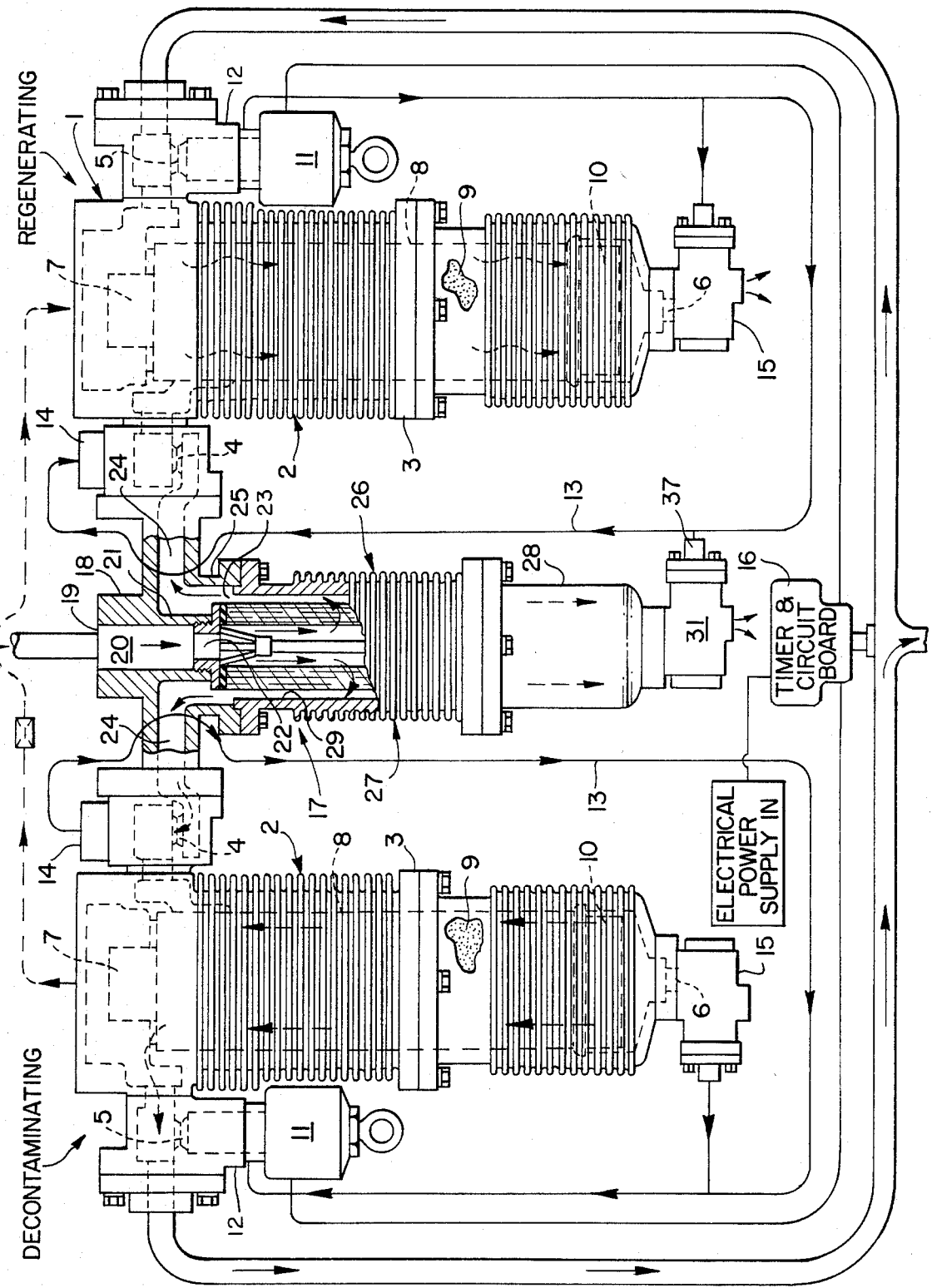
FIG. 1 is a schematic view of a twin tower assembly incorporating the improved precoalescer unit of the present invention.
Figure 2:
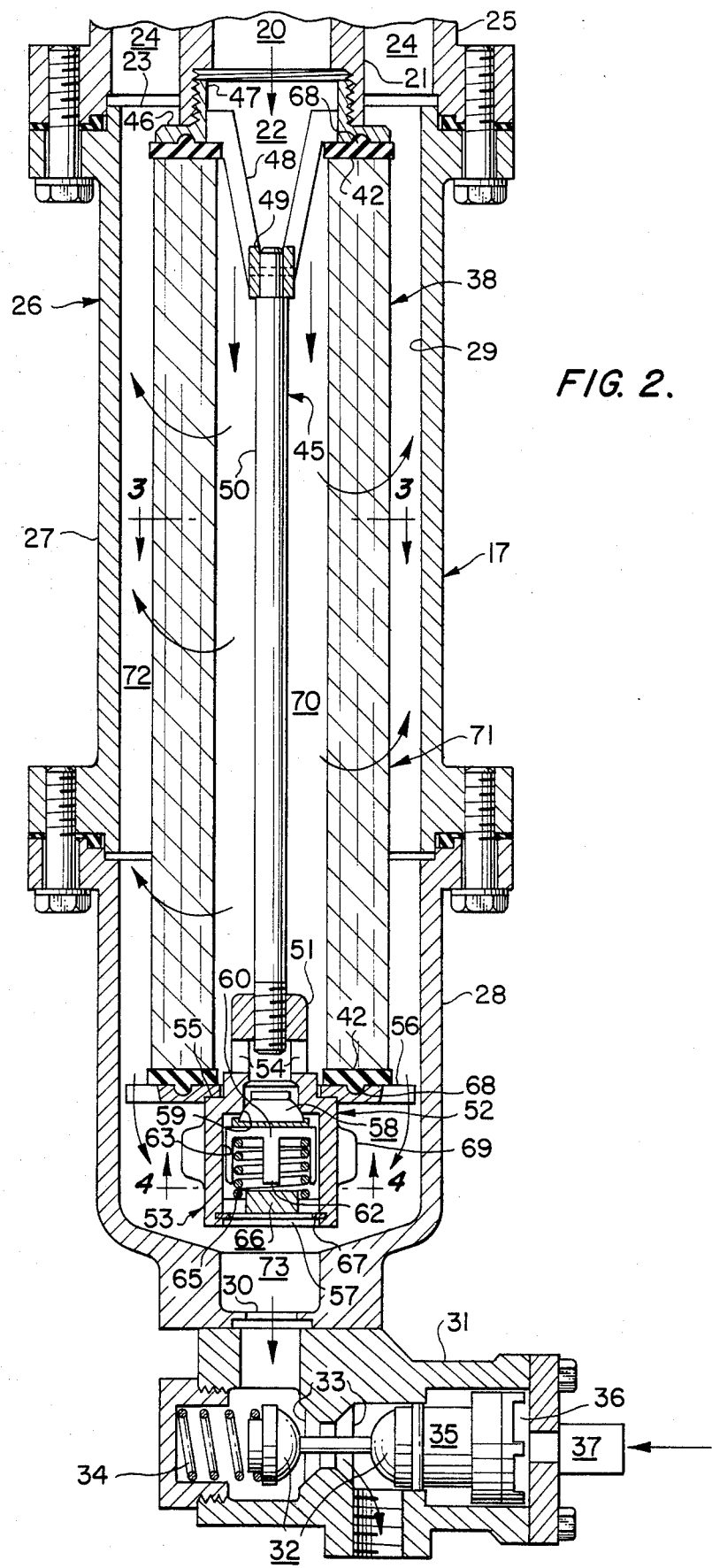
FIG. 2 is a vertical sectional view on an enlarged scale of the coalescer unit of FIG. 1.
Figure 3:
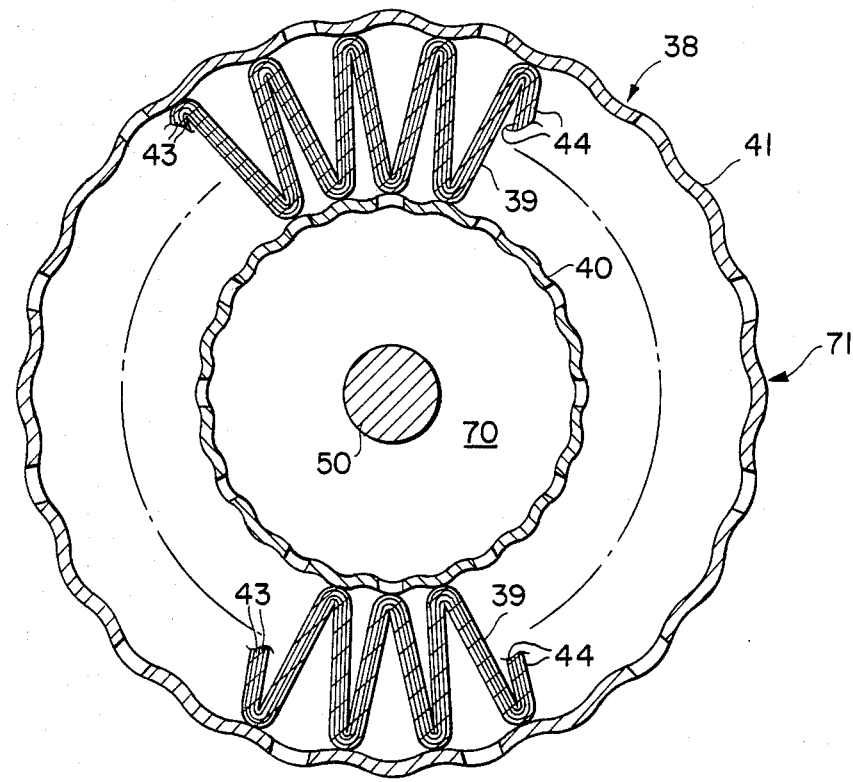
FIG. 3 is a horizontal sectional view taken along lines 3—3 of FIG. 2.
Figure 4:
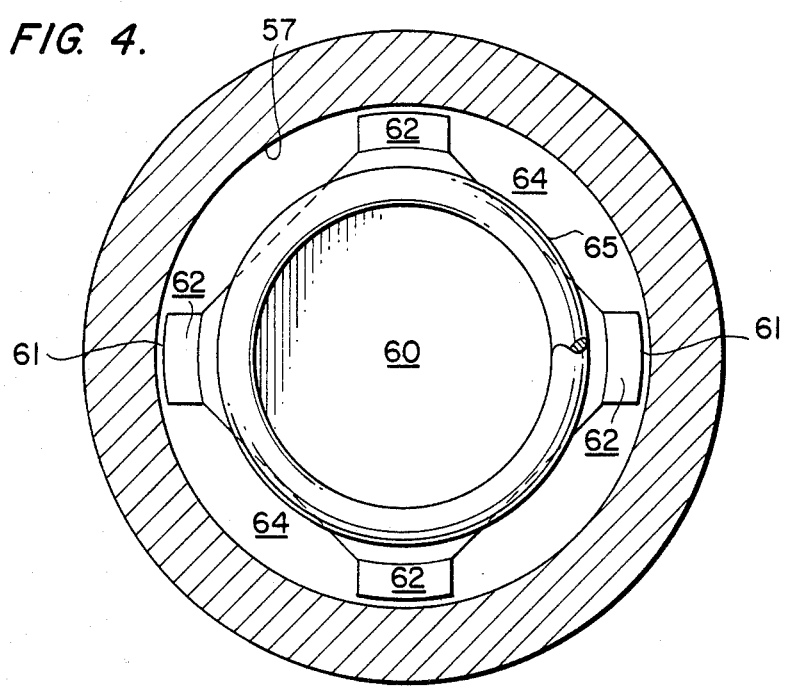
FIG. 4 is a horizontal sectional view taken along lines 4—4 of FIG. 2.

Referring now in detail to the drawings in which like references characters designate like parts, the improved precoalescer unit of the present invention is particularly designed for use with the twin tower compressed gas decontaminating assembly of my now-allowed copending application Ser. No. 456,416, filed Jan. 7, 1983, and is so illustrated and described as exemplary of the invention. Since, save as modified by the present invention, the twin tower assembly of the schematic view of FIG. 1 is shown and described in detail in my copending application, the disclosure thereof is incorporated by reference herein and only such of the details of the assembly will now be described as are needed in understanding the present invention.

Designated as 1, the twin tower assembly is comprised of twin towers 2 each including a housing 3 having valved inlet, outlet and drain ports 4, 5 and 6, respectively, and containing a canister-compactor assembly 7, the canister 8 of which contains a particulate desiccant 9, preferably in the form of a molecular sieve adapted to adsorb moisture. Each of the illustrated towers 2 also contains upstream of the desiccant 9 a woven wire mesh coalescer 10 for coalescing and separating any oil entrained in gas entering the housing before it can reach the desiccant 9.

Each tower 2 has a solenoid-actuated or "solenoid" valve 11 suspended from and supplied clean or decontaminated gas through an outlet manifold 12 common to both towers. Connected by an actuating gas line 13 to the tower's inlet and drain valves 14 and 15, respectively, the solenoid valve 11 of each tower, under control of a timer 16, alternately opens and closes for respectively supplying and draining actuating gas to and from those valves. With the inlet valve 14 closed and drain valve 15 opened by actuating gas, the effect of the opening and closing of the solenoid valve 11 is alternately to cycle the tower between regenerating and decontaminating cycles, in the latter decontaminating gas entering through the inlet port 4 and in the former regenerating the desiccant 9 and in part the coalescer 10 by a reverse flow of purge gas drained with accumulated contaminants through the then open drain valve 15. The timer 16 not only alternately opens and closed the solenoid valves 11 of both towers 2 but also relatively alternates the cycles of the towers so that one is in its decontaminating cycle when the other is in its regenerating cycle and vice versa. Predetermined in duration by the timer 16, the decontaminating and regenerating cycles of the assembly 1, for installation in a diesel locomotive, suitable are one minute each.

Designated as 17, the improved precoalescer unit of the present invention is positioned or disposed in advance or upstream of the towers' inlet ports 4 in the flow path of contaminated gas from the source to those ports. Adapted to coalesce and separate oil from the contaminated supply gas before it reaches the towers, the unit 17 conveniently is mounted on or supported from an inlet manifold 18, modified from that of my copending application to connect the manifold's inlet 19 through an inlet passage 20 extending through a downwardly opening inner or central annular boss 21 in the manifold to an inlet port 22 of the coalescer unit. In turn, an outlet port 23 of the precoalescer unit 17 is separately connected to the inlet ports of the towers through ways 24 merging in a downwardly opening or downstanding outer annular boss 25 of the manifold. The outer boss 25 is coaxial with and of larger diameter than or radially outwardly spaced from the inner boss 21 and the bosses together serve to mount the precoalescer unit 17 on the inlet manifold 18.

The precoalescer unit 17 is comprised of a vertically disposed or upstanding, generally cylindrical casing or housing 26 conveniently formed of cast aluminium and divided vertically into upper and lower parts, 27 and 28, respectively, at least the upper of which is externally finned or ribbed for efficient dissipation of heat received from the source gas. The casing has a cylindrical bore 29 open at the top and closed at the bottom except for a drain port 30 and mounts or has suspended at the bottom below and opening upwardly onto the drain port a drain valve 31. Doubled seated with a pair of opposed valve heads 32 straddling and alternately seatable in oppositely facing seats 33, the drain valve is closed by the force of a return spring 34 acting on one end of a piston 35 mounting both valve heads and opened by the opposing force of actuating gas on the piston's opposite end. For supplying and draining actuating gas, the drain valve 31 has an actuating gas chamber 36 connected to the actuating gas line 13 of one or the other of the towers 2. Since the drain valve 31 is double headed and double seated and the valve heads 32 are alternately seatable, the drain valve is open only in the short intervals in the advance and return strokes of the piston 35 in which both valve heads are unseated. Thus, with its connection for actuating gas to one of the actuating gas lines 13, the drain valve 31 will open once during each of the decontaminating and regenerating cycles of the tower supplying the actuating gas and the opening interval will be on the order of a second or less, with a longer interval obtainable by connecting the drain valve to the actuating gas line 13 through a pressure snubbing coupling 37 containing a sintered metal or other suitable snubbing element.

The precoalescer unit 17 contains in the casing 26 an open-ended tubular coalescer 38. Preferably formed of a corrugated or pleated multilayered coalescing medium 39 sandwiched between inner and outer rigid foraminous cylindrical tubes 40 and 41, respectively, the coalescer has the tubes and sandwiched coalescing medium closed at opposite ends by annular, preferably somewhat relilient molded plastic end caps 42. Multilayered, the corrugated coalescing medium 39 preferably contains a plurality of layers 43 of randomly arranged, epoxy or other suitable resin-coated or bonded borosilicate fibers of different densities, of which the inner or leading is the less dense or coarser. Since the borosilicate layers alone are insufficiently strong to maintain the corrugated shape responsible for the high coalescing efficiency of the unit 17, the corrugated medium has the borosilicate layers sandwiched between suitably woven porous pliable support layers 44, such as polyester.

The casing 26 of the precoalescer unit 17 has its preferably flanged upper end removably mounted, as by bolting with suitable gasketing, to the peripherally flanged lower end of the outer boss 25 of the inlet manifold 18. The coalescer 38 in the casing 26 also is removably mounted on and suspended from the inlet manifold 18, but independently of the casing. The mounting 45 for the coalescer includes in sequence from top to bottom a suitably one-piece or integral casting comprised of an annular downwardly facing upper seat 46, an annular flange 47 upstanding from the seat and screwed or threaded into the inner boss 21 in the inlet manifold 18 and a spider 48 inside of and downstanding from the seat and flange and terminating downwardly in a collar 49, and a rod 50 having an upper end seated in and pinned to the collar 49 and coaxial with the casing 26 and the inner and outer cylindrical bosses 21 and 25.

The lower end of the rod 50 is threaded or screwed into a throat or relatively narrow upper end portion 51 of a valve body 52 of a coalescer valve 53 forming the lower end portion of the coalescer mounting 45. The throat 51 is interrupted radially by a plurality of circumferentially spaced slots 54 and therebelow the body 52 is widened to present externally an upwardly facing annular shoulder or abutment 55 for loosely receiving and supporting the lower seat 56 for the coalescer 38 in the form of a centrally apertured, peripherally slotted disc slidable into place before attachment of the body to the rod 50. Below the shoulder 55, the body 52 contains in a downwardly opening cylindrical socket or cavity 57 a downwardly opening upwardly closing valve element or head 58 of the coalescer valve 53. Seatable in a seat 59 at the upper end of the socket, the valve head 58 is mounted on and backed by a backing member or plate 60 generally rectangular in cross-section with rounded or cylindrically convex corners 61 and correspondingly rounded guide legs 62 depending from the corners and therewith coaxial or concentric with and slidably engaging the side 63 of the socket for guiding the valve head in its opening and closing movements. With the backing member 60 so constructed, any gas and accumulated contaminants passing through the slots 54 and seat 59 when the valve 53 is open, are free to pass through the sectoral openings 64 between the corners 61 and between the guide legs 62 depending from those corners.

The backing member 60 receives or seats between the legs 62 an upwardly acting return spring 65 normally holding the valve head 58 in closed position and reacting against a peripherally slotted retainer plate 66 held in place in the socket 57 by a lock ring 67. For centering the coalescer 38 in the casing 26, the seats 46 and 56 are grooved for receiving annular ribs 68 on the end caps 42. Radially outstanding wings 69 on the valve body 52 below the shoulder 55 for turning the valve body relative to the rod 50, enable the vertical spacing between the coalescer seats to be adjusted to fit the coalescer sufficiently tightly to block passage, of gas from the inside to the outside between the resilient end caps and the seats.

In the operation of the illustrated apparatus in which the assembly of my copending application is modified to incorporate or include the precoalescer unit 17, compressed gas from a compressor or other source is continuously passed to and through the coalescer unit and made available to the towers 2 for entry through the inlet port 4 of and further decontaminating by whichever tower is in its decontaminating cycle. Entering the apparatus through the inlet 19 of the inlet manifold 18, the gas from the source is passed through the manifold's inner boss 21 and the inlet port 22 of the coalescer unit 17 to the inside, interior or bore 70 of the in-out tubular coalescer 38 and thence passes through the coalescer's side wall 71 to the annular passage 72 between that wall and the casing 26 for discharge from that passage through the unit's outlet port 23 to the inlet ports 4 of the towers 2. Since all of the gas from the source passes through the coalescer unit 17, any particles of scale, dirt or other contaminants too large to pass through the side wall 71 of the coalescer 38 will be trapped and accumulated in its inside 70 and, if not removed, would progressively coat the inside of that wall and plug or blind the coalescer against passing gas to the towers. Such obstruction of the coalescer 38 is prevented by the coaction or cooperation of the internal coalescer valve 53 and drain or purge valve 31.

Double seated and double headed and connected for supply and bleeding of actuating gas to the actuating gas line 13 of one of the towers 2, the drain valve will open for a short interval on unseating of both of its valve heads 32 during each of the decontaminating and regenerating cycles of the tower to which it is connected for actuating gas. The open intervals of the drain valve 31 are short relative to the duration of the tower's cycles and can be as little as a fraction of a second or, if desired, increased through coupling of the drain valve to the actuating gas line 13 through the pressure snubbing coupling 37. Whatever its duration, each open interval of the drain valve 31 will cause the pressure in the bottom of the casing 26 to drop and produce a differential between that pressure and the pressure of the entering contaminated gas sufficient to overcome the opposing force of the spring 65 and open the coalescer valve for discharge, under force of the entering contaminated gas and through the valve body 52, drain port 30 and drain valve 31, of any contaminants that have accumulated in the inside 70 of the coalescer 38. With the open intervals of the drain and coalescer valves 31 and 57 so short relative to the cycles of the towers, the compressed gas discharged through the drain valve during those intervals will be miniscule or minute relative to the volume of gas passed through the coalescer unit 17 to the towers 2.

Except for the relatively minute volume discharged in purging the precoalescer unit 17 on opening of the drain valve 31 and internal coalescer valve 57, the contaminated gas entering the coalescer 38 from the source and usually entraining both moisture and oil, the latter in the form of a mist or aerosol dispersion and larger particles, in passing through the borosilicate layers 43 of the corrugated coalescing medium 39, will have its oil content coalesced into relatively large particles that, on reaching the outside of the coalescer's side wall 71, will flow by gravity downwardly therealong to and accumulate in a sump 73 in the bottom of the casing 26. On opening of the drain valve 31 and coincident opening of the coalescer valve 53 during each of the decontaminating and regenerating cycles of either of the towers 2, the contaminated source gas will wash any contaminants from the inside 70 of the coalescer 38 through the valve body 53 to the sump 73 and discharge all of the accumulated contaminants from the sump through the drain valve 31. Practically oil free, the gas passed from the precoalescer unit alternately to the towers 2 through the latters' inlet ports 4, will entrain any remaining oil as coalesced larger particles that will be readily removed by the coalescers 10 in the towers, leaving for adsorbtion by the desiccant 9 in the towers moisture entrained in the then oil-free gas.

From the above detailed description it will be apparent that there has been provided for a twin tower compressed gas decontaminating assembly a precoalescer unit adapted not only to coalesce and substantially remove oil entrained in contaminated compressed gas from a source but, without interrupting flow of gas to the towers, is cyclically purged of contaminants accumulated both inside and outside of an in-out tubular coalescer by valving responsive in opening and closing to cycling of the towers. It should be understood that the described and disclosed embodiment is merely exemplary of the invention and that all modifications are intended to be included that do not depart from the spirit of the invention and the scope of the appended claims.

Having now described my invention, I claim:

1. In apparatus for decontaminating compressed gas, the combination with twin towers each having a housing containing a desiccant and having inlet, outlet and drain valves and a solenoid valve connected by an actuating gas line to the inlet and drain valves, the towers under timer control of the solenoid valves alternately receiving gas from a source of contaminated gas and individually cycling between decontaminating and regenerating cycles, of a precoalescer unit comprising a casing containing a tubular coalescer interposed in the path of flow of gas from said source to inlet ports of said towers, and valve means on and in said casing and responsive to cycling of the towers for opening for an interval during each decontaminating and purge cycle of a tower for purging said unit of contaminants accumulated in said casing inside and outside of said coalescer.

2. A precoalescer unit according to claim 1, wherein the valve means are a double-seated drain valve on said casing and a coalescer valve inside said casing and normally closing a lower end of the tubular coalescer, said drain valve being connected for actuation to an actuating gas line of one of the towers and opening and closing in response to and for an interval during each of the decontaminating and regenerating cycles of said tower, and said coalescer valve opening under differential pressure in response to opening of said drain valve for enabling contaminated gas received from said source in said coalescer cyclically to wash from the inside of said coalescer and through said valves contaminants accumulated in said coalescer.

3. A precoalescer unit according to claim 2, wherein the tubular coalescer includes a side wall formed of a corrugated coalescing medium sandwiched between inner and outer rigid foraminous tubes, gas flows uninterruptedly from the source through the coalescer's side wall to inlet ports of the towers for coalescing by said coalescing medium oil in mist or larger particle form entrained in the gas, and coalesced oil is accumulated on the outside of the coalescer for flow downwardly by gravity therealong to the bottom of the casing and discharged therefrom through said drain valve under force of source gas passed through the coalescer valve on opening of said valves.

4. A precoalescer unit according to claim 3, including an inlet manifold having an inlet connected to the source of contaminated gas and outlets separately connected to inlet ports of the towers, and wherein the casing and coalescer are separately suspended from said inlet manifold, the coalescer for interiorly receiving through said inlet contaminated gas from the source and the casing for passing substantially oil-free gas passed through the coalescer to the inlet ports of the towers.

5. A precoalescer unit according to claim 2, wherein the drain valve has alternately seating heads, is open only when both heads are unseated, and is actuated by supply and bleeding of actuating gas through the connected actuating gas line for opening for a short interval during each decontaminating and regenerating cycle of the connected tower.

6. A precoalescer unit according to claim 1, wherein the tubular coalescer is an in-out coalescer adapted uninterruptedly to receive in its inside contaminated gas from the source and pass that gas through a side wall containing a corrugated multilayered coalescing medium for coalescing oil in mist and larger particle form entrained in the gas.

* * * * *